(12) United States Patent
Bishop et al.

(10) Patent No.: US 9,905,226 B2
(45) Date of Patent: *Feb. 27, 2018

(54) VOICE COMMAND DEFINITIONS USED IN LAUNCHING APPLICATION WITH A COMMAND

(71) Applicant: Microsoft Technology Licensing, LLC, Redmond, WA (US)

(72) Inventors: F. Avery Bishop, Redmond, WA (US); Travis Wilson, Redmond, WA (US); Robert Chambers, Sammamish, WA (US); Robert Brown, Kaleen (AU)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/171,064

(22) Filed: Jun. 2, 2016

(65) Prior Publication Data

US 2016/0275949 A1    Sep. 22, 2016

Related U.S. Application Data

(63) Continuation of application No. 13/830,318, filed on Mar. 14, 2013, now Pat. No. 9,384,732.

(51) Int. Cl.
*G10L 15/22* (2006.01)
*G06F 3/16* (2006.01)
(Continued)

(52) U.S. Cl.
CPC ............ *G10L 15/22* (2013.01); *G06F 3/16* (2013.01); *G06F 3/167* (2013.01); *G10L 15/063* (2013.01);
(Continued)

(58) Field of Classification Search
CPC ................................ G10L 15/00; G10L 15/22
See application file for complete search history.

(56) References Cited

U.S. PATENT DOCUMENTS 5,386,494 A * 1/1995 White .................. G10L 15/22
704/231
7,409,344 B2 8/2008 Gurram et al.
(Continued)

OTHER PUBLICATIONS

"Dragon NaturallySpeakingTM Creating Voice Commands", Retrieved from: <<http://speechrecsolutions.com/assets/VoiceCmd.pdf>>, Aug. 1998, 141 Pages.
(Continued)

*Primary Examiner* — Douglas Godbold

(57) ABSTRACT

A voice command definition file (VCDF) declaratively defines voice commands for an application. For example, the VCDF may include definitions for: voice commands; one or more phrases/utterances that may be said to execute each of the commands; a navigation location to navigate to within the application (e.g. a page); phrase lists containing items that may be used as a parameter in a voice command; examples; feedback; and the like. A user may say a single utterance to launch the application, navigate to the associated location of the command and execute the command. The VCDF may define multiple ways to listen for a particular command. The VCDF may be edited/defined by a user and may include a user friendly name for an application. A speech engine loads the VCDF for use such that it may recognize the commands associated with an application. The definitions may be updated during runtime.

20 Claims, 12 Drawing Sheets

(51) Int. Cl.
*G10L 15/06* (2013.01)
*G10L 15/193* (2013.01)

(52) U.S. Cl.
CPC .... *G10L 15/193* (2013.01); *G10L 2015/0635* (2013.01); *G10L 2015/223* (2013.01)

(56) References Cited

U.S. PATENT DOCUMENTS

| | | | | |
|---|---|---|---|---|
| 8,165,886 | B1* | 4/2012 | Gagnon | G10L 15/19 704/275 |
| 8,595,642 | B1* | 11/2013 | Lagassey | G06F 3/048 704/275 |
| 8,996,375 | B1* | 3/2015 | Gagnon | G10L 15/19 704/257 |
| 9,384,732 | B2* | 7/2016 | Bishop | G06F 3/16 |
| 2003/0171929 | A1* | 9/2003 | Falcon | G10L 15/30 704/275 |
| 2003/0182131 | A1* | 9/2003 | Arnold | G10L 15/32 704/275 |
| 2004/0010410 | A1* | 1/2004 | Oh | G10L 15/22 704/246 |
| 2005/0144009 | A1* | 6/2005 | Rodriguez | G06F 17/2735 704/275 |
| 2006/0206336 | A1* | 9/2006 | Gurram | G06F 3/167 704/275 |
| 2007/0233499 | A1* | 10/2007 | Yudkovitch | A61B 8/00 704/275 |
| 2008/0208591 | A1* | 8/2008 | Ativanichayaphong | G10L 15/19 704/275 |
| 2008/0255852 | A1 | 10/2008 | Hu | |
| 2008/0300886 | A1* | 12/2008 | Patch | G10L 15/00 704/275 |
| 2010/0169098 | A1* | 7/2010 | Patch | G10L 15/00 704/275 |
| 2012/0078635 | A1* | 3/2012 | Rothkopf | G10L 15/30 704/270.1 |
| 2013/0073294 | A1* | 3/2013 | Burns | G10L 15/22 704/275 |

OTHER PUBLICATIONS

"Use Voice Commands to Control Your Mac", Retrieved from: <<http://www.gbradhopkins.com/archives/2004/09/use_voice_commands_to_control.html>>, Retrieved on: Mar. 7, 2013, 6 Pages.
"Voice Actions Commands", Retrieved from: <<http://support.google.com/nexus/bin/answer.py?hl=en&answer=2666064>>, Retrieved on: Mar. 7, 2013, 1 Page.
"Voice Commands for Windows Phone 8", Retrieved from <<https://msdn.microsoft.com/library/windows/apps/jj206959(v=vs.105).aspx>>, Feb. 1, 2013, 10 Pages.
"Final Office Action Issued in U.S. Appl. No. 13/830,318", dated Dec. 7, 2015, 14 Pages.
"Final Office Action Issued in U.S. Appl. No. 13/830,318", dated Apr. 28, 2015, 14 Pages.
"Non-Final Office Action Issued in U.S. Appl. No. 13/830,318", dated Aug. 18, 2015, 14 Pages.
"Non-Final Office Action Issued U.S. Appl. No. 13/830,318", dated Jan. 7, 2015, 13 Pages.
"Notice of Allowance issued in U.S. Appl. No. 13/830,318", dated Mar. 16, 2016, 9 Pages.
Bishop, F. Avery, "Speech-enabling a Windows Phone 8 App with Voice Commnds", in Proceedings of the MSDN Magazine, 27(11), Nov. 2012, 8 Pages.
Parker, Mark "Using VoiceXML in a UCMA 3.0 Application (Part 1 of 4)", Retrieved from: <<http://msdn.microsfot.com/en-us/library/lync/hh243693(v=office.14).aspx>>, Jun. 2011, 4 Pages.
U.S. Appl. No. 13/830,313, Amendment and Response filed Apr. 2, 2015, 11 pages.
U.S. Appl. No. 13/830,318, Amendment and Response filed Jul. 28, 2015, 11 pages.
U.S. Appl. No. 13/830,318, Amendment and Response filed Nov. 18, 2015, 12 pages.
U.S. Appl. No. 13/830,318, Amendment and Response filed Feb. 18, 2016, 12 pages.

* cited by examiner

```xml
<?xml version="1.0" encoding="utf-8"?>
<VoiceCommands xmlns="http://schemas.com/voicecommands/1.0">
  <CommandSet xml:lang="en-us" Name="$w00sh-enUS">
    <!-- The command prefix provides an easier or 'friendlier' name for the application -->
    <CommandPrefix> swoosh </CommandPrefix>          ← 310
    <Example> play my Mozart playlist </Example>    ← 315
    <Command Name="showAllPlaylists">               ← 320
      <Example> show all my playlists </Example>   ← 316
      <!-- ListenFor elements for all ways to say the same command -->
      <ListenFor> show [all] my playlists </ListenFor>
      <ListenFor> what can I play </ListenFor>
      <Feedback> Showing all of your playlists... </Feedback>  ← 340
      <Navigate Target="/ViewPlaylists.xaml"/>     ← 350
    </Command>
    <Command Name="playPlaylist">                   ← 321
      <Example> play my Mozart playlist </Example>    ← 317
      <ListenFor> play [my] {composer} [playlist] </ListenFor>  ← 331
      <Feedback> Playing {composer}... </Feedback> - says this when  ← 341
launching
      <Navigate Target="/PlayComposer.xaml"/>      ← 351
    </Command>
    <PhraseList Label="composer">                   ⎰ 360
      <Item> Beethoven </Item>
      <Item> Mozart </Item>
      <Item> Chopin </Item>
      <Item> Schubert </Item>
      <Item> Bach </Item>
    </PhraseList>
    <!-- Other command elements -->
  </CommandSet>
  <CommandSet xml:lang="ja-jp" Name="$w00sh-jaJP">
    <!-- Content for other languages -->
  </CommandSet>
</VoiceCommands>
```

300 (top right marker); 330 points to ListenFor block

FIG.3

```xml
<?xml version="1.0" encoding="utf-8"?>
<VoiceCommands xmlns="http://schemas.xxx.com/voicecommands/1.0">
  <CommandSet xml:lang="en-us" Name="MagicMemoEnu">
    <!-- Command set for US English commands-->
    <CommandPrefix>Magic Memo</CommandPrefix>
    <Example>enter a new memo</Example>

<Command Name="newMemo">
      <Example>enter a new memo</Example>
      <ListenFor>Enter [a] [new] memo</ListenFor>
      <ListenFor>Make [a] [new] memo</ListenFor>
      <ListenFor>Start [a] [new] memo</ListenFor>
      <Feedback>Entering a new memo</Feedback>
      <Navigate />   <!-- Navigation defaults to Main page -->
    </Command>

<Command Name="showOne">
      <Example>show memo number two</Example>
      <ListenFor>show [me] memo [number] {num} </ListenFor>
      <ListenFor>display memo [number] {num}</ListenFor>
      <Feedback>Showing memo number {num}</Feedback>
      <Navigate Target="/ViewMemos.xaml"/>
    </Command>

<PhraseList Label="num">
      <Item> 1 </Item>
      <Item> 2 </Item>
      <Item> 3 </Item>
    </PhraseList>
  </CommandSet>

<CommandSet xml:lang="ja-JP" Name="MagicMemoJa">
    <!-- Command set for all Japanese commands -->
    <CommandPrefix>マジック・メモ</CommandPrefix>
    <Example>新規メモ</Example>

<Command Name="newMemo">
      <Example>新規メモ</Example>
      <ListenFor>新規メモ[を]</ListenFor>
      <ListenFor>新しいメモ</ListenFor>
      <Feedback>メモを言ってください</Feedback>
      <Navigate/>
    </Command>

<Command Name="showOne">
      <Example>メモ 1 を表示</Example>
      <ListenFor>メモ{num}を表示[してください] </ListenFor>
      <Feedback>メモ{num}を表示します。 </Feedback>
      <Navigate Target="/ViewMemos.xaml"/>
    </Command>

<PhraseList Label="num">
      <Item> 1 </Item>
      <Item> 2 </Item>
      <Item> 3 </Item>
    </PhraseList>
  </CommandSet>
</VoiceCommands>
```

400 — (English CommandSet)
410 — (Japanese CommandSet)

FIG.4

VOICE COMMAND DEFINITIONS USED IN LAUNCHING APPLICATION WITH A COMMAND

CROSS-REFERENCE TO RELATED APPLICATIONS

This application is a continuation application of U.S. patent application Ser. No. 13/830,318, entitled "VOICE COMMAND DEFINITIONS USED IN LAUNCHING APPLICATION WITH A COMMAND," filed on Mar. 14, 2013, now issued U.S. Pat. No. 9,384,732, the entire disclosure of which is hereby incorporated herein by reference.

BACKGROUND

A common scenario on a computing device is to launch an application, wait for the application to load and then navigate to the correct location in the application to find and execute a command. Performing this scenario can be cumbersome as well as frustrating for a user. For example, the user first finds the application on the device, performs an operation to launch the application (e.g. tap on an icon), finds the User Interface (UI) element to perform the command, taps on the command, and so on.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A voice command definition file (VCDF) declaratively defines voice commands for an application. For example, the VCDF may include definitions for: voice commands; one or more phrases/utterances that may be said to execute each of the commands; a navigation location to navigate to within the application (e.g. a page); phrase lists containing items that may be used as a parameter in a voice command; examples; feedback; and the like. A user may say a single utterance to launch the application, navigate to the associated location of the command and execute the command. For example, a VCDF for a music player application may define to play a playlist when a user says "Play Beethoven." The VCDF may define multiple ways to listen for a particular command. For example, different users may say the same command different ways (e.g. "Play Beethoven", "Play my playlist named Beethoven", . . . ). The VCDF may be edited/defined by a user (e.g. application developer, authorized user) and may include a user friendly name for an application (e.g. "Swoosh" instead of "$XA0-appl"). A speech engine loads the VCDF for use such that it may recognize the commands associated with an application. Different VCDFs may be associated with different applications. The definitions may be updated during runtime. For example, when a new playlist is created, the name of the new playlist may be added to the phrase list that contains names for each of the playlists.

BRIEF DESCRIPTION OF THE DRAWINGS

FIG. 3 shows an example XML VCDF for a music player application;

FIG. 4 shows an example XML VCDF for a memo application including support for two different languages;

DETAILED DESCRIPTION

Figure 1:
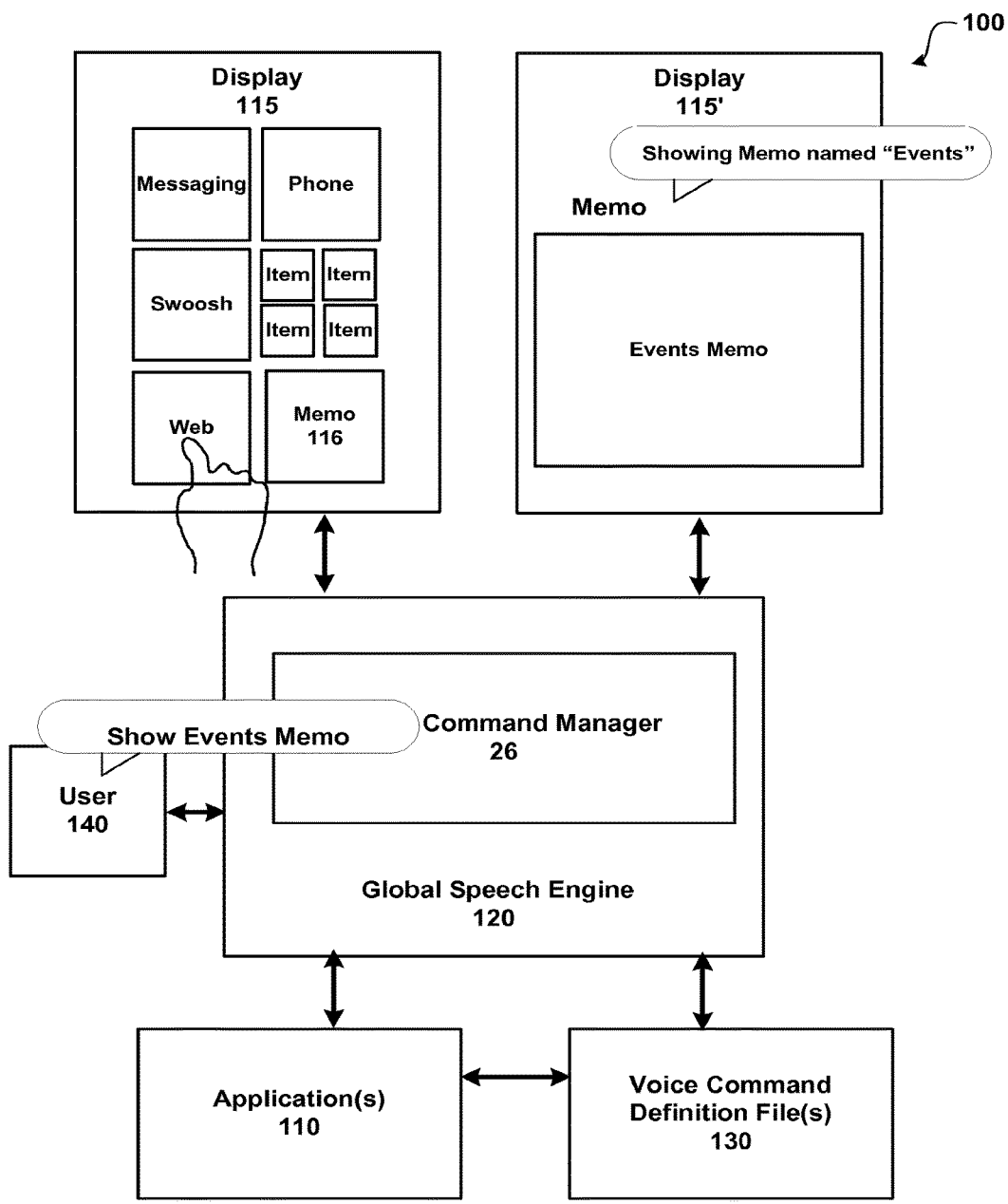
FIG. 1 shows a system for adding voice commands to an application.

Referring now to the drawings, in which like numerals represent like elements, various embodiment will be described.

FIG. 1 shows a system for adding voice commands to an application. As illustrated, system 100 includes application program(s) 110, global speech engine 120, voice command manager 26 and touch screen input device/display 115.

In order to facilitate communication with the voice command manager 26, one or more callback routines, may be implemented. Application (s) 110 may be a variety of applications, such as business productivity applications, entertainment applications, music applications, travel applications, video applications, and the like. Generally, application(s) 110 may be any application that receives user input to execute a command. The application(s) 110 may be configured to receive different types of input (e.g. speech input, touch input, keyboard input (e.g. a physical keyboard and/or SIP) and/or other types of input. One or more of the applications may be configured to use voice commands that are defined within a Voice Command Definition File(s) (VCDF).

System 100 as illustrated comprises a touch screen input device/display 115 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Global speech engine 120 is a speech recognition system that recognizes speech from different users to perform operations relating to different applications, such as application(s) 110. Speech engine 120 may support system voice commands as well as user defined voice commands for different applications (e.g. messaging, swoosh, web, memo, . . . ). Global speech engine 120 includes a grammar that it uses to recognize words/commands. An application may include its own voice commands using definitions stored within a VCDF.

According to an embodiment, each application that extends the grammar of the global speech engine uses a VCDF (e.g. a VCDF for the memo application 116, a VCDF for the music player application ("Swoosh"), and the like). For example, the memo application 116 has an associated VCDF that defines the voice commands it supports and how to execute the supported commands (an exemplary VCDF for a memo application may be seen in FIG. 4). Definitions from more than one application may be stored in a same VCDF.

Voice command manager 26 may provide information to application 110 in response to a user's voice command (i.e. "Show Events Memo", "Memo Show Events Memo"). A user may tap to select a user interface element, perform a stretch gesture to zoom in, and the like. Gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action and/or double tap; and the like.

Voice command manager 26 is configured to perform operations relating to using voice commands defined in a voice command definition file (VCDF) (e.g. VCDF 130). While voice command manager 26 is shown within a global speech engine that provides speech services for different application(s) 110, manager 26 may be located in other locations (e.g. within an application, within an operating system, within a service, and the like).

Each VCDF 130 declaratively defines voice commands for an application. For example, the VCDF may include definitions for: voice commands; one or more phrases/utterances that may be said to execute each of the commands (listen for elements); a navigation location to navigate to within the application (e.g. a page specified by a navigation element); phrase lists containing items that may be used as a parameter in a voice command; examples; feedback; and the like. VCDF 130 may be edited/defined by a user (e.g. application developer, authorized user) and may include a user friendly name for an application (e.g. "Memo" instead of a complicated/unpronounceable application name, such as "$XA7x0-appl2"). Each command in the VCDF may define multiple ways to phrase/utter a particular command. For example, different users may say different phrases to perform the same command (e.g. "show {name} memo", "edit my {name}", "Memo show {name} memo", "Memo edit my {name}", . . . ).

Generally, each listen for element defines a phrase/utterance used to select a command. In the current example shown in FIG. 1, a VCDF for the memo application 116 may define a listen for element to show a memo when a user utters "Show {memo name} [memo]." As illustrated, the listen for element includes an optional parameter (memo) that may/may not be said by the user as well as a phrase list element that may be any one of a predetermined number of items (e.g. each saved memo may be an item in the list). According to an embodiment, the utterance may/may not include the name of the application (e.g. "Memo" in the example phrases above) when saying the command.

The VCDF file may also include other parameters that affect an operation of the global speech engine. For example, a disambiguate element may be set to true or false. The VCDF may be dynamically updated (e.g. a new item is added/removed to/from a phrase list). For example, when a new memo is saved, the memo application 116 may make a call to add the name of the new memo to the phrase list.

A user may say a single utterance to launch an application (when not already running), execute the command identified within the utterance and navigate to the related page of the application using the declarations that are defined in the VCDF that is associated with the application. In the current example, user 140 says "Show Events Memo" to launch memo application 116 as shown in display 115 and open and display the memo named event as shown in display 115'. According to an embodiment, feedback (e.g. "showing memo named events") is spoken when the memo application is launching and navigating to the display of the events memo.

According to an embodiment, the voice command manager 26 launches the application (when not already running) and passes the application information to execute the command and navigate to the specified location of the application in response to identifying that the received utterance matches one of the listen for elements for the application. For example, global speech engine 120 may receive the utterance from a user (e.g. user 140), recognizes items within the utterance (e.g. words) and pass the recognized text to voice command manager 26 that determines an application and command that is associated with the utterance. According to an embodiment, voice command manager 26 includes information indicating that the application was launched using a voice command along with the recognized utterance, the location to navigate to (e.g. a specified page of the application) as well as other information that may be used by the application when performing the command. More details and examples are provided below.

Figure 2:
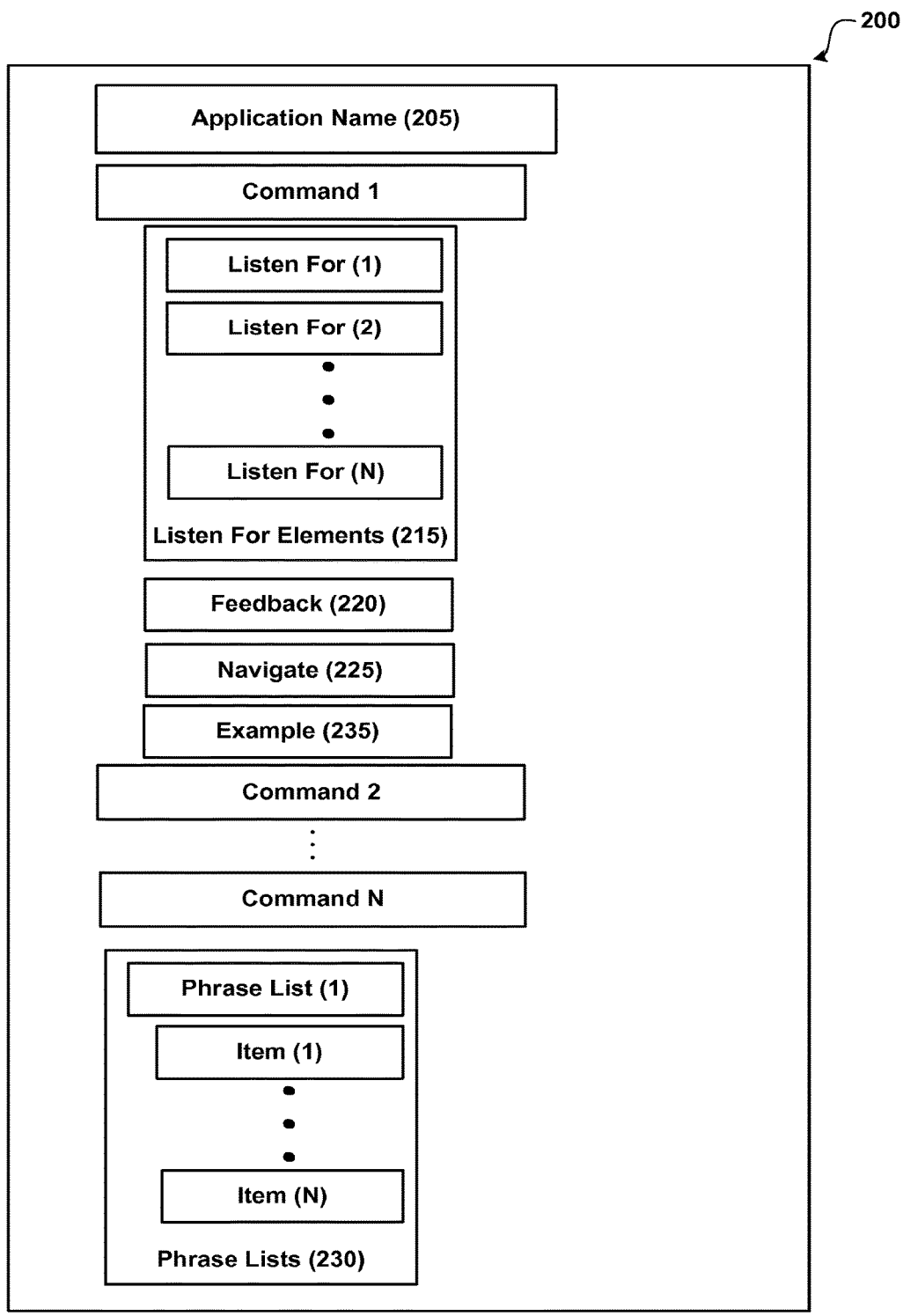
FIG. 2 shows an example structure of a Voice Command Definition File (VCDF)

FIG. 2 shows an example structure of a Voice Command Definition File (VCDF). As illustrated, VCDF 200 includes an application name element (205), command elements 1-N, listen for elements 215, feedback element 220, navigate element 225 and phrase lists 230.

Application name element 205 identifies the application to associated with the defined voice commands (e.g. commands 1-N). According to an embodiment, a user friendly name for the application may be defined within the VCDF. For example, a radio playing application may be referred to as "Radio" in an utterance instead of the actual application name (e.g. rr12&777_radion_en).

VCDF may include N number of defined voice commands for an application. For example, one application may be define one voice command, whereas another application may define six voice commands.

Each defined command includes one or more listen for elements 215 that define a syntax on what phrase/utterance is used to identify the command. When a command includes more than one listen for element, each different listen for element defines a different way to say the same command. For example, a listen for element to open a file may be defined as "Open {file}" and another listen for element for the same command may be defined as "Edit {file}".

The listen for elements 215 may include optional parameters, phrase list parameters, garbage parameters, and the like. Different methods may be used to distinguish different types of elements (e.g. brackets, braces, dollar signs, as well as other distinguishing characters). According to an embodiment, value/values entered within: brackets ("[ . . . ]") represent optional elements (e.g. words); braces ("{ . . . }") represent a phrase list having the name of the value between the braces; $GARBAGE represents a garbage element that represents to disregard a recognized element at the location of the $GARBAGE element. Different parameters may be nested (e.g. [{words}], [value1 [value2]], . . . ). More examples are illustrated in FIG. 3 and FIG. 4.

The feedback element 220 includes information to present (e.g. displayed/spoken) to the user while the application is loading and/or at some other time during the execution of the command.

The navigate element 225 defines a location in the application to navigate to when executing the command and launching the application. For example, the navigate element may define a path to a page within the application and/or define a display screen or some other location in the application related to the execution of the command.

The example element 235 defines an example for a voice command. An example element may be included at different locations within the VCDF. For example, an example element that is defined outside a command is a general example that may be shown on a general help screen. An example element under a command is an example specific to the command. All/portion of the values defined by the example elements may be used in various scenarios. For example, when help is requested for a specific command, an example element may be shown for that command and when help is requested for the application, each example element may be shown.

Phrase lists 230 define one or more phrase lists that may be used to specify items (e.g. words) to listen for at the location of the phrase list element within the listen for element. Zero or more phrase lists may be associated with an application and/or command. More examples relating to VCDF definitions are illustrated and described below.

FIG. 3 shows an example XML VCDF for a music player application. As illustrated, FIG. 3 includes voice command definitions for the $w00sh-enUS application.

As illustrated VCDF 300 follows an XML format that includes a command prefix element, example elements, command name elements, listen for elements, feedback elements, navigate elements, and a phrase list element comprising different items. While VCDF 300 is illustrated as XML, different formats may be used to store definitions within the VCDF (e.g. text file, JSON, . . . ).

In the current example, a user friendly name of "swoosh" is used as the application name (defined by the command prefix element 310) in the speech recognition system instead of the actual name "$w00sh-enUS."

Example 315 "play my Mozart playlist", example 316 "show all my playlists" and example 317 "play my Mozart playlist" may be used to show/say examples to a user on what voice commands are supported by the system.

Exemplary VCDF 300 shows two commands including "show all playlists" 320 and "play playlist" command 321. Command 321 includes two different Listen for elements 330 that specify different ways of activating the same command.

The first listen for element "show [all] my playlists" for command 320 includes an optional word "all" that may or may not be said by a user to perform the command. According to an embodiment an optional word in the utterance is defined within an opening bracket "[" and a closing bracket "]". While not illustrated in the current example, optional elements may be nested (e.g. show [all [of] [the]] my playlists). Command 320 executes when the recognized utterance is either "show my playlists" or "show all my playlists." The second listen for element for command 320 defines another voice command ("what can I play") that may be used to execute command 320. More/fewer listen for elements may be defined for a command (e.g. 1 to N).

The listen for element 331 for the "play Playlist" command 321 "play [my] {composer} [playlist]" includes optional words "my" and "playlist" and a phrase list parameter (e.g. one or more words) that are selected from a phrase list. The braces "{ }" around the word "composer" define that the parameter at that location within the utterance is to be selected from a phrase list having the name "composer." According to an embodiment, the phrase list definition may be updated during runtime of the application and/or at other times to include more/fewer items. For example, each time a playlist is added/removed, the phrase list within the VCDF may be updated.

The navigate elements 350 and 351 defines what page the application is to load when the command is executed. For example, instead of displaying the main page of the application, the page related to the command is initially displayed.

FIG. 4 shows an example XML VCDF for a memo application including support for two different languages. As illustrated, FIG. 4 includes voice command definitions for the MagicMemoEnu application that has a user friendly name defined by the command prefix element of "Magic Memo."

As illustrated VCDF 400 includes a command set section 410 for another language (Japanese in this example) in addition to English. More/fewer language sections may be included. Generally, a command set is included within the VCDF for each supported language. According to another embodiment, each different language may be included in a separate file. According to an embodiment, when the global recognition language is switched to another language, the CommandSet for the language switched to is loaded and activated.

Figure 5:
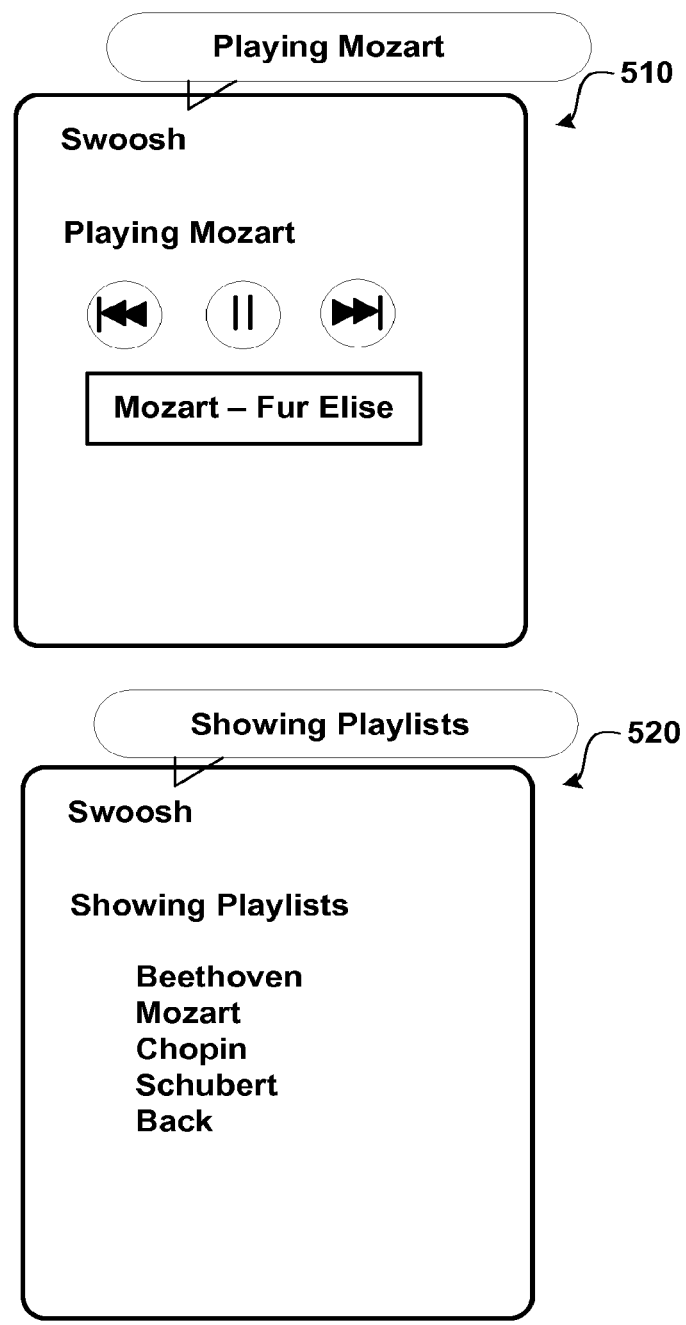
FIG. 5 shows example displays of an application launched using a voice command defined within a VCDF.

FIG. 5 shows example displays of an application launched using a voice command defined within a VCDF.

Display 510 illustrates a display of the "Swoosh" application launched in response to receiving a voice command. The voice commands (e.g. "Swoosh Play Mozart", "Play Mozart", "Swoosh Play my Mozart", "Play my Mozart", "Swoosh Play my Mozart playlist", "Play my Mozart playlist") may be recognized by the speech recognition system as being associated with the same command. In response to recognizing the voice command, the Swoosh application (e.g. ="$w00sh-enUS"), is automatically launched to the play screen (instead of the home screen for the application) and a song from the Mozart playlist (e.g. "Fur Elise") begins playing. In many cases, use of a voice command may save the user from having to manually navigate many different pages of the music player application. According to an embodiment, the Swoosh application provides feedback (e.g. "Playing Mozart") to the user. This feedback may be shown and/or spoken before the command is performed by the application. For example, when the song begins playing the feedback may be removed from the display and/or the spoken feedback has completed playing.

Display 520 shows a display of the "Swoosh" application launched in response to receiving another voice command. The voice command (e.g. "Swoosh Show all my playlists", "Show all my playlists", "Swoosh Show my playlists", "Show my playlists", "Swoosh What can I play", "What can I play") is recognized by the speech recognition system as the same command (e.g. different listen for elements for the same command in the VCDF). In response to recognizing the voice command, the Swoosh application (e.g. ="$w00sh-enUS) launches (when not already running), provides any feedback defined within the VCDF and displays each of the playlists.

Figure 6:
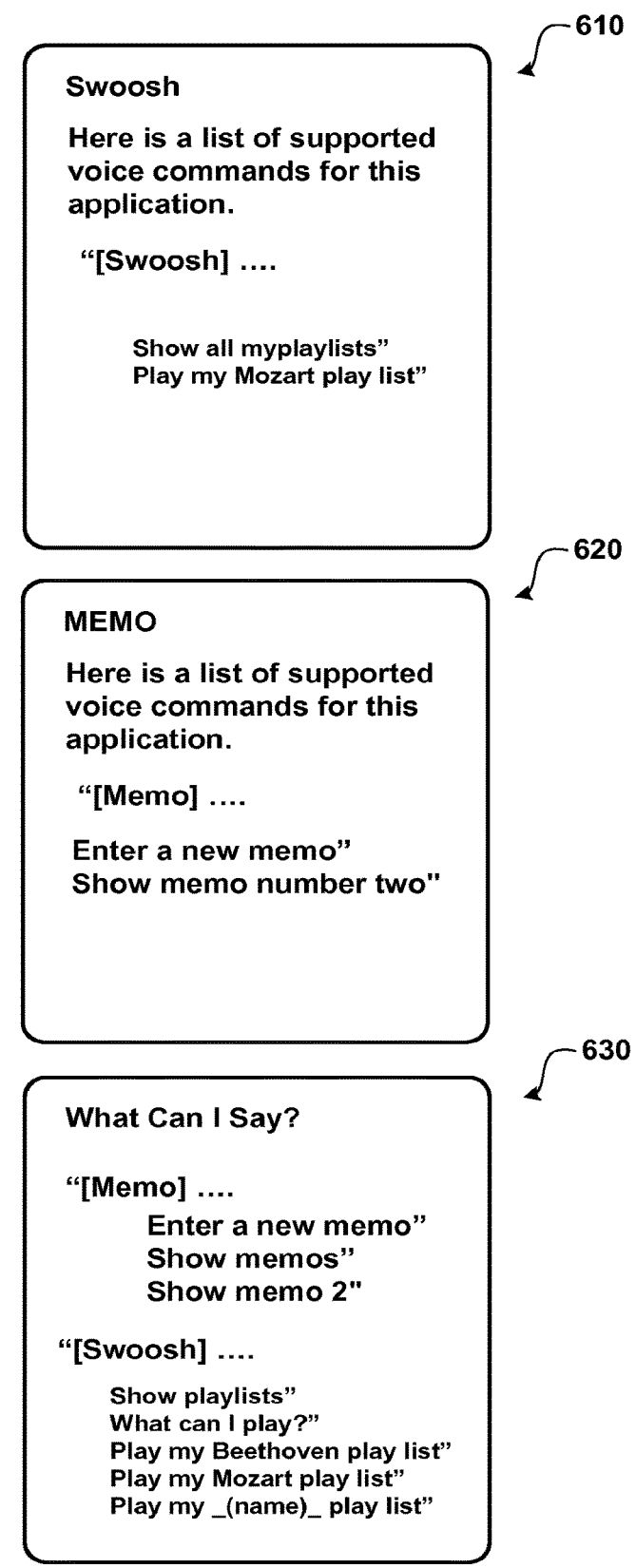
FIG. 6 illustrates exemplary displays showing help pages for what voice commands are supported by an application.

FIG. 6 illustrates exemplary displays showing help pages for what voice commands are supported by an application.

Display 610 shows a help page for the Swoosh application. According to an embodiment, the examples displayed are obtained from the VCDF (e.g. example elements). Examples in the VCDF (e.g. FIG. 3) for the Swoosh application include "Show all my playlists", "Play my Mozart play list" Display 610 illustrates that a user may/may not include in the name of the application (e.g. "Swoosh") in the example voice commands that are supported.

Display 620 shows a help page for an example Memo application. Examples in the VCDF (e.g. FIG. 4) for the memo application include "enter a new memo", "show memo number two." Display 620 illustrates that a user may/may not include in the name of the application (e.g. "Memo") in the example voice commands that are supported.

Display 630 shows a help page for multiple applications. For example, the help page may display voice command examples for more than one application. Help for each application supporting voice commands may be shown, help for related applications may be shown, and/or some other method/combination may be used to determine what voice commands are supported by different applications. Display 630 illustrates that a user may/may not include in the name of the applications (e.g. "Memo" and "Swoosh") in the example voice commands that are supported.

Figure 7:
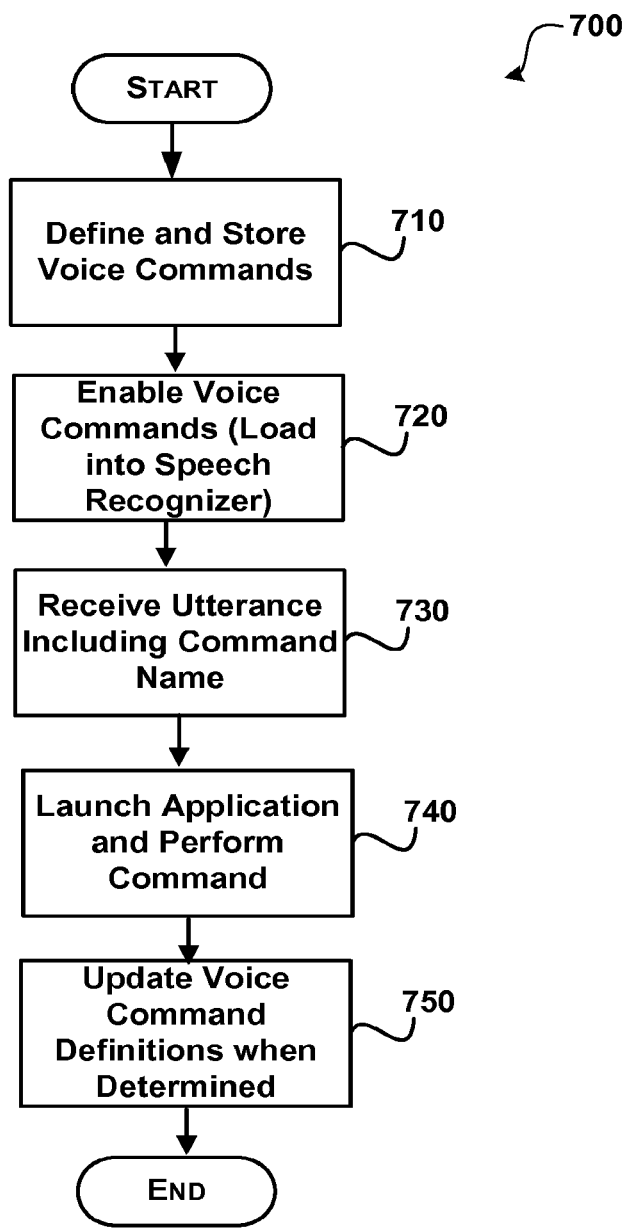
FIG. 7 shows an illustrative process for defining and using a voice command definition for launching an application and performing a command using a single utterance.

FIG. 7 shows an illustrative process for defining and using a voice command definition for launching an application and performing a command using a single utterance. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process moves to operation 710, where voice commands for an application are defined and stored. The voice commands may be defined using different methods. According to an embodiment, an eXtensible Markup Language (XML) format is used to define the voice commands. Other formats may be used (e.g. text file, Java Script Object Notation (JSON), HTML, . . . ). Generally, the VCDF includes definitions for different voice commands for the application, any parameters associated with the commands, phrase lists, feedback to deliver when performing the command, and a navigation command used to navigate to the relevant location within the application. The VCDF may define multiple ways to listen for a particular command (e.g. different listen for elements). A user (e.g. application developer, authorized user, end user . . . ) may define different voice commands to associate with the application.

Moving to operation 720, the voice commands are enabled for the application. Enabling the voice commands for the application includes using the definitions in the VCDF to add to the system grammar that is used during speech recognition by the speech engine. According to an embodiment, the VCDF is loaded by the application associated with the VCDF. According to another embodiment, the VCDF is loaded into the system grammar based upon an occurrence of an event (e.g. turning on the computing device, saving the VCDF, selecting a UI element, saying a command, performing a gesture, and the like). The following is an example method (InstallCommandSetsFromFileAsync) that may be used to initialize a VCDF for an application.

```
1.   using Speech.VoiceCommands;
2.   //...
3.   private async void Application_Launching(object sender,
4.     LaunchingEventArgs e)
5.   {
6.     try // try block to detect compilation errors in VCD file
7.     {
8.       await VoiceCommandService.InstallCommandSetsFromFileAsync(
9.         new Uri("os-appx:///MagicMemoVCD.xml"));
10.    }
11.    catch (Exception ex)
12.    {
13.      // Handle exception
14.    }
15.  }
```

A call to the InstallCommandSetsFromFileAsync method inspects and validates each of the command sets contained in the file, and installs the command set whose language (e.g. xml:lang) attribute matches that of the global speech engine. If the user switches the global recognition language to one that matches the xml:lang of a different CommandSet in the VCD, then the CommandSet for that language is loaded and activated.

Flowing to operation 730, an utterance is received that includes a command name. According to an embodiment, the utterance also includes an application name. According to another embodiment, the application name is an optional element in the utterance. According to an embodiment, the utterance is received by a global speech engine that is associated with the computing device. The global speech engine may support system voice commands as well as voice commands for different applications. As discussed herein, the grammar of the global speech engine is extended to support voice commands for other applications by loading one or more VCDFs. For example, an application developer may define a set of voice commands in a VCDF to associate with an application and then load that VCDF into the global speech engine for the computing device that is configured to run the application. As discussed herein, the utterance may include content that is optional and/or not used by the global speech engine. According to an embodiment, a garbage parameter may be defined within the VCDF (e.g. within a listen for element) that indicates to ignore any spoken content in the utterance before/between/after other parameters. For example, a listen for element may be defined as "Play $GARBAGE {playlist} $GARBAGE." The content of the utterance between "Play" and the playlist word (determined from the items in the defined playlist, as well as words in the utterance after the playlist parameter are ignored. For example, the utterance "Play my favorite composer Mozart because that is what I like the best" is treated as the utterance "Play Mozart."

Transitioning to operation 740, the application is launched and the command is executed. The application when launched receives information regarding a location of where to navigate to in the application, one or more parameters used in executing the command, how the application was launched (e.g. voice command), and the like. The following is an example of handling voice commands in an application (e.g. a memo application):

```
1.   // Takes appropriate action when the application is launched by voice command.
2.   private void ViewMemosPage_Loaded(object sender, RoutedEventArgs e)
3.   {
4.     // Other code omitted
5.     // Handle the case where the page was launched by Voice Command
6.     if (this.NavigationContext.QueryString != null
7.       && this.NavigationContext.QueryString.ContainsKey("voiceCommandName")
     )
8.     {
9.       // Page was launched by Voice Command
10.      string commandName =
11.        NavigationContext.QueryString["voiceCommandName"];
12.      string spokenNumber = "";
13.      if (commandName == "showOne" &&
14.        this.NavigationContext.QueryString.TryGetValue("num",
15.          out spokenNumber))
16.      {
17.        // Command was "Show memo number 'num'"
18.        int index = -1;
19.        if (int.TryParse(spokenNumber, out index) &&
20.          index <= memoList.Count && index > 0)
21.        { // Display the specified memo
22.          this.Dispatcher.BeginInvoke(delegate
23.          { MessageBox.Show(String.Format(
24.            "Memo {0}: \"{1}\"", index, memoList[index − 1])); });
25.        }
26.      }
27.    }
28.  }
```

Flowing to operation 750, the voice command definitions within the VCDF may be updated by an application. The voice command definitions may be updated when the application is running and/or at some other time. For example, an application may dynamically change items in a phrase list in response to a change made in the application (e.g. adding/deleting a playlist, adding/deleting some other content, . . . ). There are many reasons why items in a phrase list may change. The following is an example of updating a phrase list within a VCDF:

```
1.   // Updates the "num" PhraseList to have the same number of
2.   // entries as the number of saved memos;
3.   // "Magic Memo show memo 5" if there are five or more memos saved
4.   private async void UpdateNumberPhraseList(string phraseList,
5.     int newLimit, string commandSetName)
6.   {
7.     // Helper function that sets string array to {"1", "2", etc.}
8.     List<string> positiveIntegers =
9.       Utilities.GetStringListOfPositiveIntegers(Math.Max(1, newLimit));
10.    try
11.    {
12.      VoiceCommandSet vcs = null;
13.      if (VoiceCommandService.InstalledCommandSets.TryGetValue(
14.        commandSetName, out vcs))
15.      {
16.        // Update "num" phrase list to the new numbers
17.        await vcs.UpdatePhraseListAsync(phraseList, positiveIntegers);
18.      }
19.    }
20.    catch (Exception ex)
21.    {
22.      this.Dispatcher.BeginInvoke(delegate
23.        { MessageBox.Show("Exception in UpdateNumberPhraseList "
24.          + ex.Message); }
25.      );
26.    }
27.  }
```

The process then flows to an end operation and returns to processing other actions.

Figure 8:
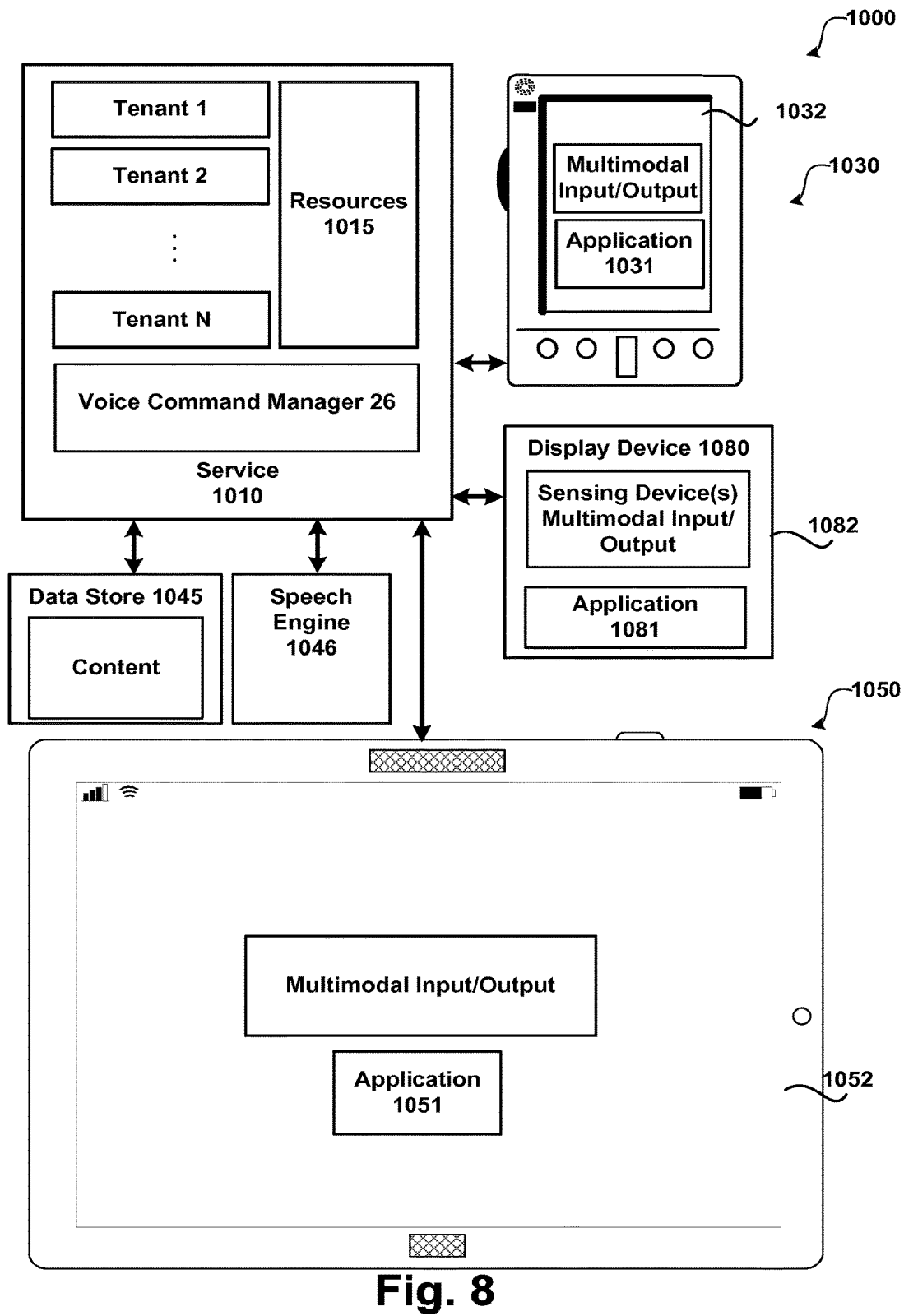
FIG. 8 illustrates an exemplary system that may use voice command definition files for defining voice commands for one or more applications.

FIG. 8 illustrates an exemplary system that may use voice command definition files for defining voice commands for one or more applications. As illustrated, system 1000 includes service 1010, data store 1045, speech engine 1046, touch screen input device 1050 (e.g. a slate), smart phone 1030, and display device 1080 (e.g. monitor/television, . . . ).

Each device (e.g. device 1050, smart phone 1030, display device) may be configured to receive input from one or more sensing devices. The sensing device may be a part of the device and/or separate from the device. The sensing device may be configured to capture user input using various input methods. A sensing device may include one or more microphones to capture spoken input (e.g. words) and one or more cameras to detect movement of a user (e.g. pictures/videos). The sensing device may also be configured to capture other inputs from a user such as by a keyboard and/or mouse (not pictured). For example, the sensing device may be a MICROSOFT KINECT® device comprising a plurality of cameras and a plurality of microphones As illustrated, service 1010 is a cloud based and/or enterprise based service that may be configured to provide one or more services. The service may be configured to be interacted with using different types of input/output. For example, a user may use speech input, touch input, hardware based input, and the like. The service may provide speech output and/or sound effects. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device 1050 and display device 1080 are configured with multimodal applications (1031, 1051, 1081). While the application is illustrated as part of the device, the application may be a network application (e.g. included as part of service 1010) that is stored externally from the device.

As illustrated, touch screen input device 1050, smart phone 1030 and display device 1080 shows exemplary displays 1052/1032/1082 showing the use of an application that utilize voice commands and multimodal input/output (e.g. speech/graphical displays/gestures (touch/non-touch)). Data may be stored on a device (e.g. smart phone 1030, slate device 1050 and/or at some other location (e.g. network data store 1045). Data store 1045 may be used to store content. The applications used by the devices may be client based applications, server based applications, cloud based applications and/or some combination.

Voice command manager 26 is configured to perform operations relating to using voice commands declaratively defined as described herein. While manager 26 is shown within service 1010, the all/part of the functionality of the manager may be included in other locations (e.g. on smart phone 1030, slate device 1050 and/or display device 1080).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 9:
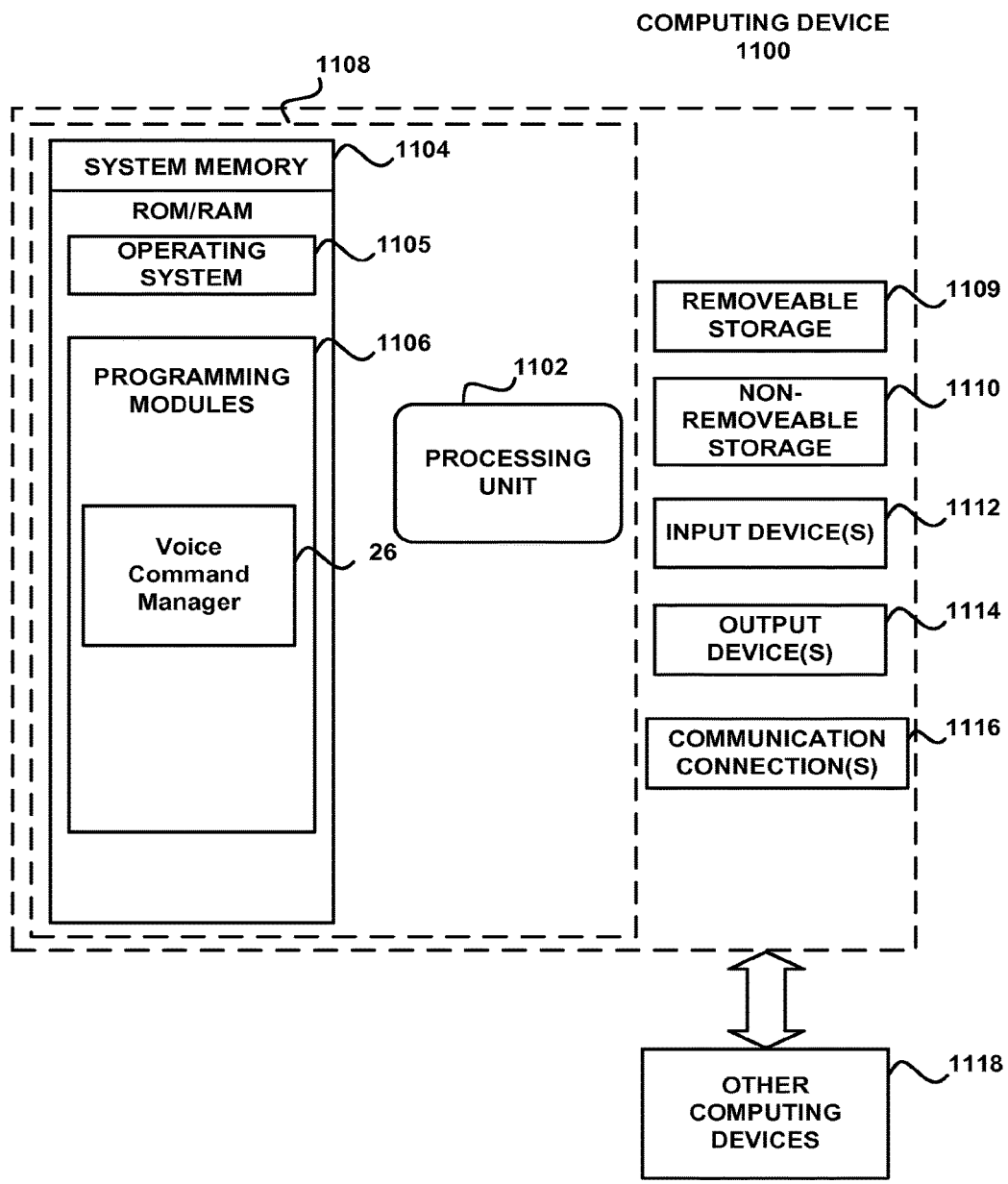
FIGS. 9, 10A, 10B, and 11 and the associated descriptions provide a discussion of a variety of operating environments in which embodiments of the invention may be practiced.
Figure 10A:
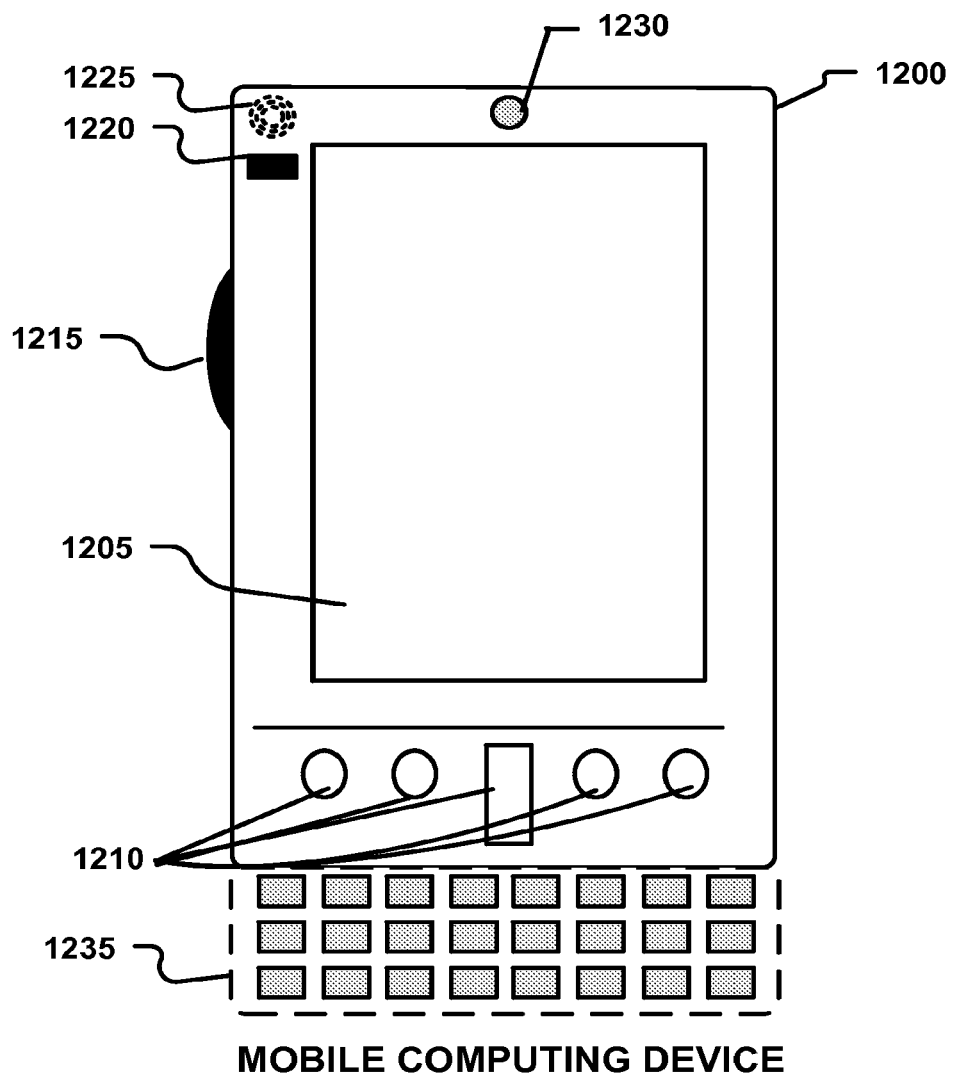
Figure 10B:
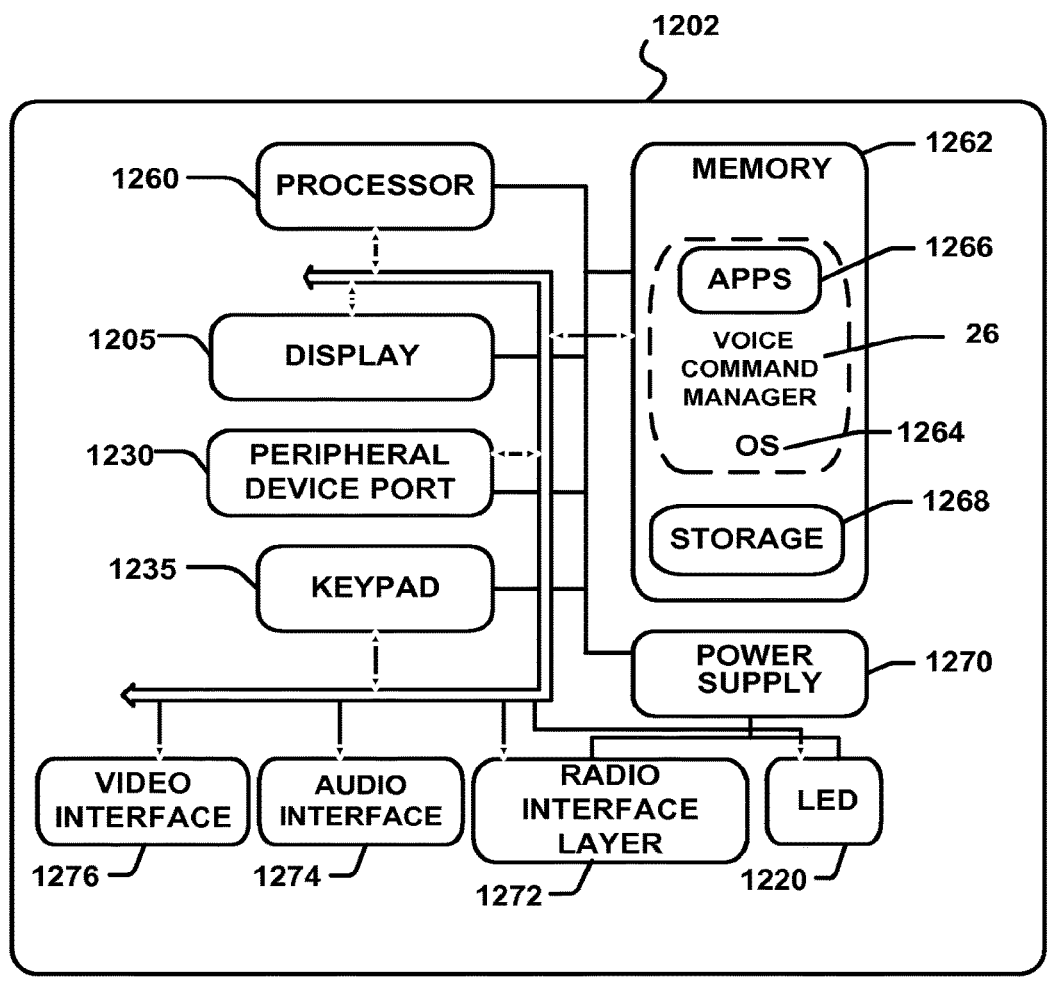
Figure 11:
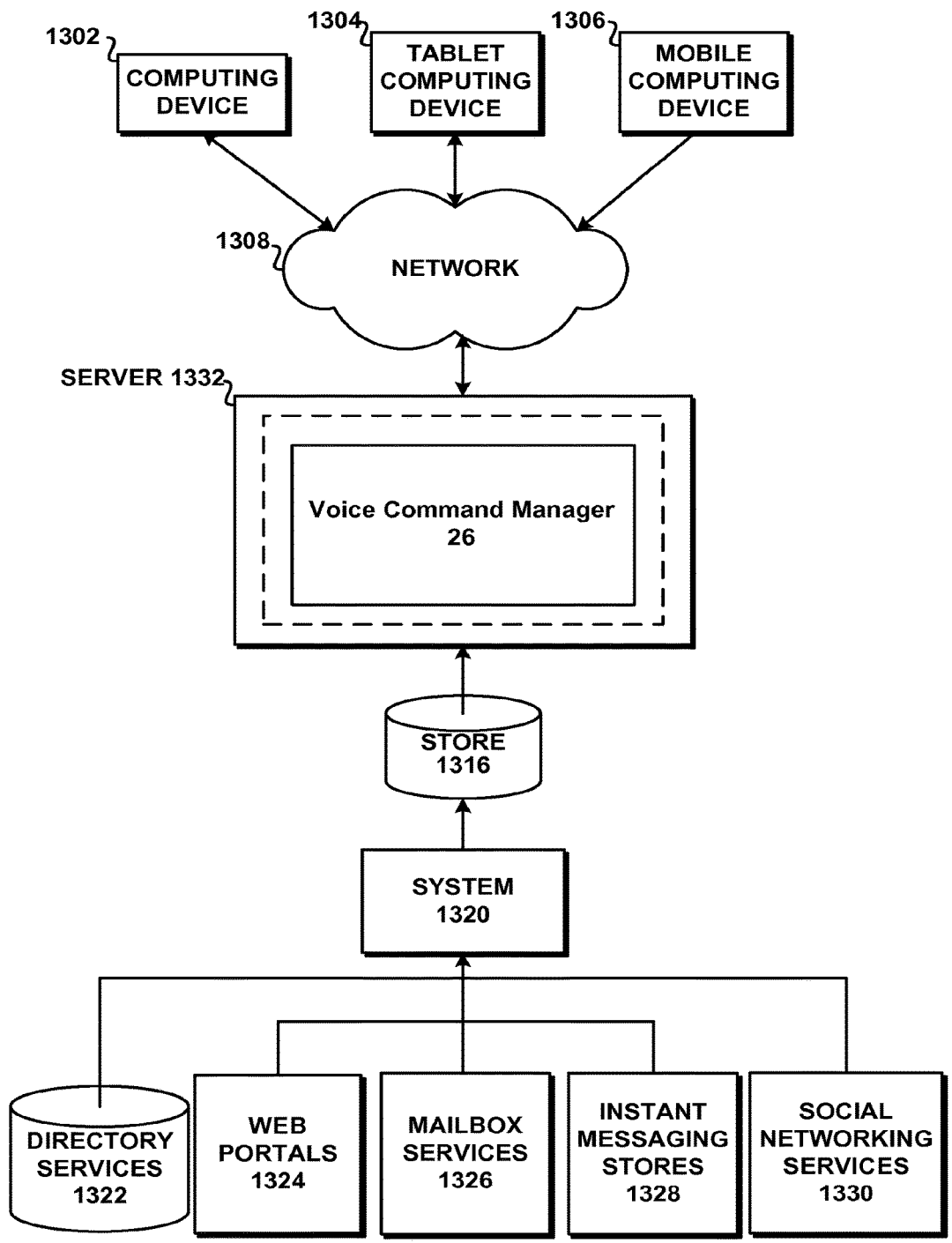

FIGS. 9, 10 and 11 and the associated descriptions provide a discussion of a variety of operating environments in which embodiments of the invention may be practiced. However, the devices and systems illustrated and discussed with respect to FIGS. 9, 10 and 11 are for purposes of example and illustration and are not limiting of a vast number of computing device configurations that may be utilized for practicing embodiments of the invention, described herein.

FIG. 9 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a voice command manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 9 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. A sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A and 10B illustrate a suitable mobile computing environment, for example, a mobile telephone, a smartphone, a tablet personal computer, a laptop computer, and the like, with which embodiments of the invention may be practiced. With reference to FIG. 10A, an example mobile computing device 1200 for implementing the embodiments is illustrated. In a basic configuration, mobile computing device 1200 is a handheld computer having both input elements and output elements. Input elements may include touch screen display 1205 and input buttons 1210 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1210. Mobile computing device 1200 may also include an optional keypad 1235. Optional keypad 1235 may be a physical keypad or a "soft" keypad generated on the touch screen display.

Mobile computing device 1200 incorporates output elements, such as display 1205, which can display a graphical user interface (GUI). Other output elements include speaker 1225 and LED 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 10B is a block diagram illustrating components of a mobile computing device used in one embodiment, such as the computing device shown in FIG. 10A. That is, mobile computing device 1200 can incorporate system 1202 to implement some embodiments. For example, system 1202 can be used in implementing a "smart phone" that can run one or more applications similar to those of a desktop or notebook computer such as, for example, spreadsheet applications, presentation applications, browser, e-mail, scheduling, instant messaging, and media player applications. In some embodiments, system 1202 is integrated as a computing device, such as an integrated personal digital assistant (PDA) and wireless phoneme.

One or more application 1266 may be loaded into memory 1262 and run on or in association with operating system 1264. Examples of application programs include phone dialer programs, e-mail programs, PIM (personal information management) programs, word processing programs, spreadsheet programs, presentation/slideshow programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as spreadsheet content, document content, e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the voice command manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world," via a communications carrier or service provider. Transmissions to and from radio 1272 are conducted under control of OS 1264. In other words, communications received by radio 1272 may be disseminated to application 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone to receive audible input, such as to facilitate a telephone conversation. In accordance with embodiments of the present invention, the microphone may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 8B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 11 illustrates a system architecture for a system as described herein.

Components managed via the voice command manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to methods/processes as described herein. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
   receiving an utterance at a global speech engine that performs speech recognition for different applications;
   determining, from the received utterance, a command portion that specifies a command for an application to execute;
   identifying a Voice Command Definition File (VCDF) for processing of the command portion, wherein the VCDF comprises definitions for voice commands and a navigation location element for launching an application in a state corresponding with a voice command;
   identifying, using the VCDF, the voice command based on the command portion; and
   transmitting data to the application for the application to launch in a state defined by the identified VCDF based on the navigation location element and the identified voice command.

2. The method of claim 1, further comprising loading the VCDF into the global speech engine such that a grammar of the global speech engine is updated to include support for the command to be performed by the application as defined by the VCDF.

3. The method of claim 1, wherein determining the command portion comprises identifying at least one parameter for the command in the command portion of the utterance, and wherein the voice command is identified based on the identified parameter.

4. The method of claim 1, wherein the VCDF includes at least one listen for element that defines a syntax on how to recognize the voice command, and wherein different listen for elements for the command each specify a different syntax to specify the voice command based on the command portion.

5. The method of claim 4, wherein the listen for element for the command comprises a phrase list parameter that represents any one of a list of items that are defined in a phrase list specified within the VCDF, and wherein identification of an item within the phrase list indicates to the global speech engine that a specific VCDF is to be utilized to process the utterance.

6. The method of claim 4, wherein the listen for element for the command defines a garbage parameter that instructs the global speech engine to disregard content in the utterance based on the location of the content within the utterance.

7. The method of claim 1, wherein the VCDF defines a feedback element that is delivered in response to launching the application, and wherein the navigation location element instructs the application to launch at a specific page of the application.

8. The method of claim 1, further comprising detecting a change in application content of the application, and updating data of the VCDF in response to detecting the change in the application content.

9. A system comprising:
   at least one processor; and
   a memory operatively connected with the at least one processor, wherein the memory stores computer-executable instructions that, when executed by the at least one processor, causes the at least one processor to execute a method that comprises:
   receiving an utterance at a global speech engine that performs speech recognition for different applications;
   determining, from the received utterance, a command portion that specifies a command for an application to execute;
   identifying a Voice Command Definition File (VCDF) for processing of the command portion, wherein the VCDF comprises definitions for voice commands and a navigation location element for launching an application in a state corresponding with a voice command;
   identifying, using the VCDF, the voice command based on the command portion; and
   transmitting data to the application for the application to launch in a state defined by the identified VCDF based on the navigation location element and the identified voice command.

10. The system of claim 9, wherein the method further comprises loading the VCDF into the global speech engine such that a grammar of the global speech engine is updated to include support for the command to be performed by the application as defined by the VCDF.

11. The system of claim 9, wherein determining the command portion further comprises identifying at least one parameter for the command in the command portion of the utterance, and wherein the voice command is identified based on the identified parameter.

12. The system of claim 9, wherein the VCDF includes at least one listen for element that defines a syntax on how to recognize the voice command, and wherein different listen for elements for the command each specify a different syntax to specify the voice command based on the command portion.

13. The system of claim 12, wherein the listen for element for the command comprises a phrase list parameter that represents any one of a list of items that are defined in a phrase list specified within the VCDF, and wherein identification of an item within the phrase list indicates to the global speech engine that a specific VCDF is to be utilized to process the utterance.

14. The system of claim 12, wherein the listen for element for the command defines a garbage parameter that instructs the global speech engine to disregard content in the utterance based on the location of the content within the utterance.

15. The system of claim 9, wherein the VCDF defines a feedback element that is delivered in response to launching the application, and wherein the navigation location element instructs the application to launch at a specific page of the application.

16. The system of claim 9, wherein the method further comprises detecting a change in application content of the application, and updating data of the VCDF in response to detecting the change in the application content.

17. A method comprising:
receiving an update to application content of an application;
updating data of a Voice Command Definition File (VCDF) in response to the update to the application content, wherein the VCDF comprises definitions for voice commands and a navigation location element for launching an application in a state corresponding with a voice command;
receiving an utterance;
determining, from the utterance, a command portion that specifies a command for the application to execute;
identifying, using the updated VCDF, the voice command based on the command portion; and
transmitting data to the application for the application to launch in a state defined by the updated VCDF based on the navigation location element and the identified voice command.

18. The method according to claim 17, wherein determining the command portion comprises identifying at least one parameter for the command in the command portion of the utterance, and wherein the voice command is identified based on the identified parameter.

19. The method according to claim 17, wherein the VCDF includes at least one listen for element that defines a syntax on how to recognize the voice command, and wherein different listen for elements for the command each specify a different syntax to specify the voice command based on the command portion.

20. The method according to claim 19, wherein the listen for element for the command comprises a phrase list parameter that represents any one of a list of items that are defined in a phrase list specified within the VCDF, and wherein identification of an item within the phrase list indicates to the global speech engine that a specific VCDF is to be utilized to process the utterance.

* * * * *